July 30, 1935.   F. F. PFEFFERKORN ET AL   2,009,516
FOOD CONTAINER
Filed April 4, 1934   2 Sheets-Sheet 1
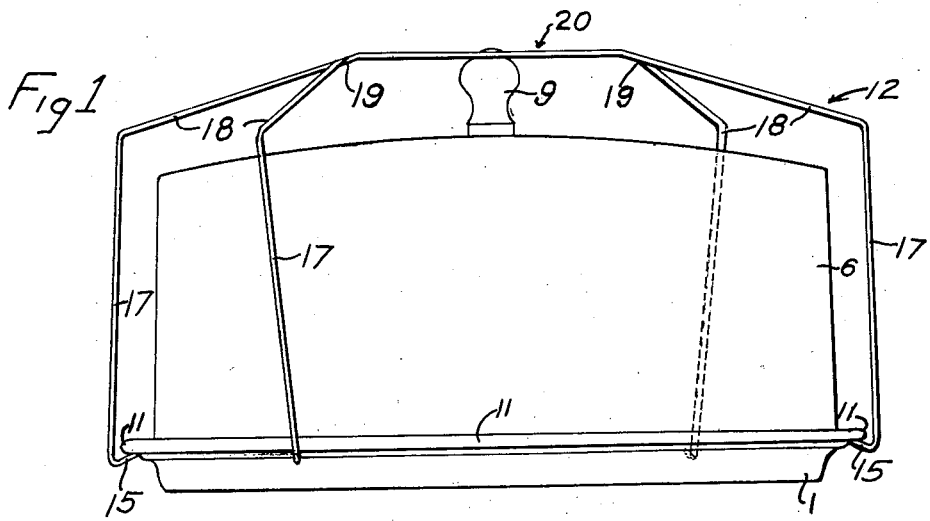
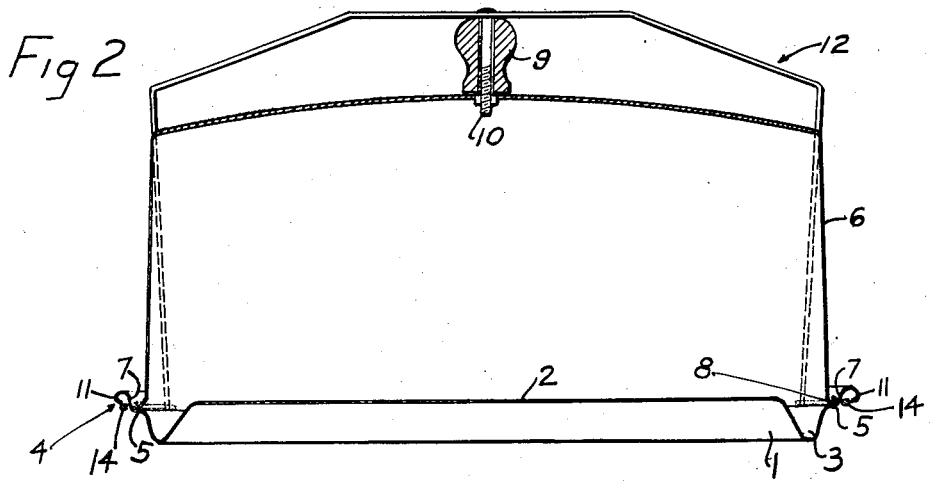
INVENTORS
Carl A. Stevens
BY Frederick F. Pfefferkorn
ATTORNEY.

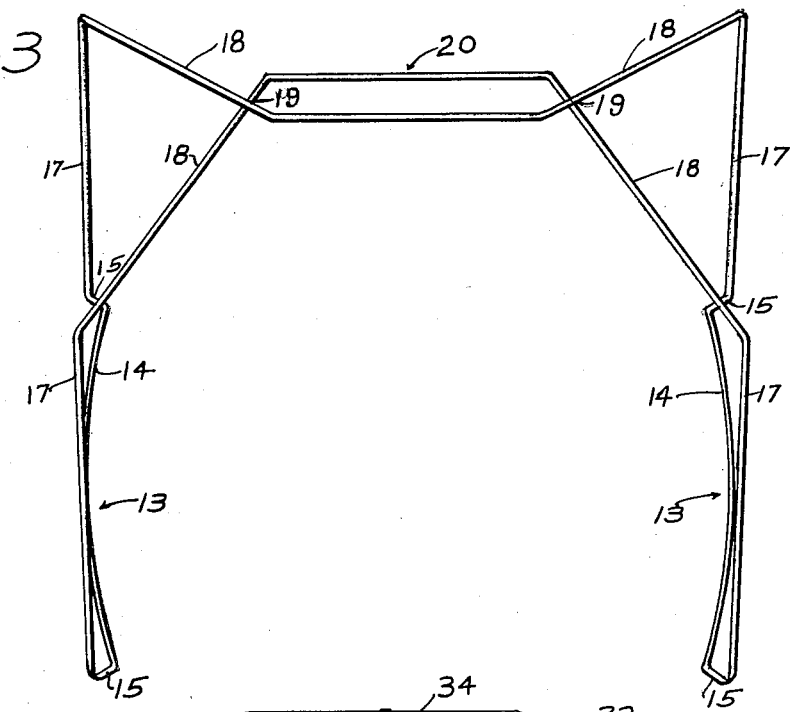
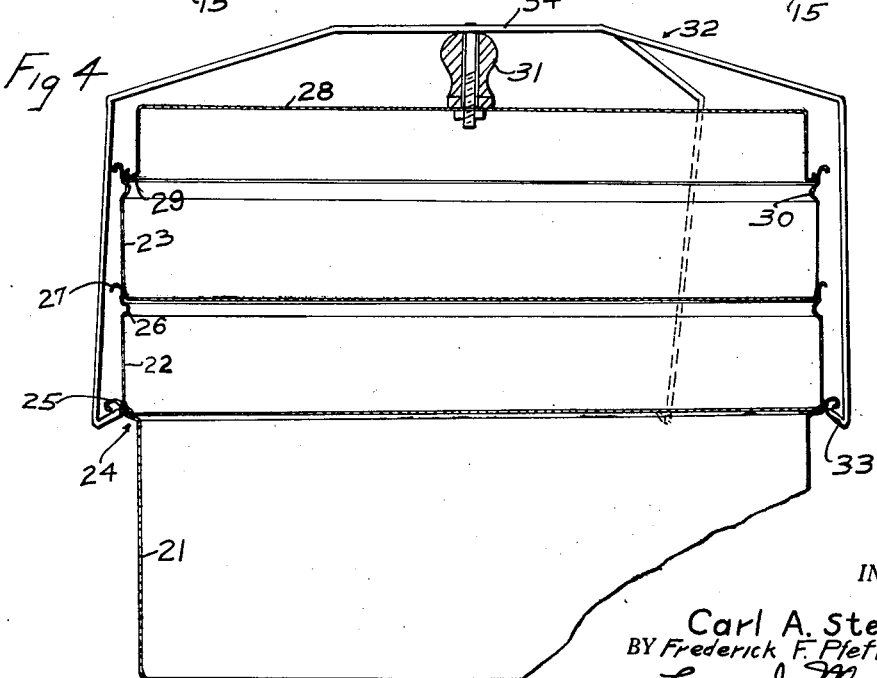

Patented July 30, 1935

2,009,516

UNITED STATES PATENT OFFICE 2,009,516

FOOD CONTAINER

Frederick F. Pfefferkorn and Carl A. Stevens, Carrollton, Ohio, assignors to The Carrollton Metal Products Co., a corporation of Ohio Application April 4, 1934, Serial No. 719,058

4 Claims. (Cl. 220—55)

This invention relates to food containers.

It is an object of this invention to provide a novel food container for home use which is readily adaptable as a conveyance for carrying food and the like. It is an object of this invention to provide a novel device for effecting those functions and which is simple in construction, inexpensive to manufacture, and practical in use.

Other objects and advantages of the present invention will appear in the following detailed description taken in connection with the accompanying drawings, in which:

Figure 1 is a view, in side elevation, of a food container embodying this invention.

Figure 2 is a view, in cross-section, of the food container illustrated in Figure 1.

Figure 3 is a view, in perspective, of a wire clip to be combined with the food container in practising this invention.

Figure 4 is a view, in cross-section, of another type of food container embodying this invention.

As shown in the drawings, the container consists of a base means which may take the form of a tray 1, in the form of the invention illustrated in Figures 1 and 2. The tray 1 has a central raised area 2 which is well suited to receive a cake or the like. A trough 3 extends around the central area 2 and serves to receive crumbs. The margin 4 of the tray flares outwardly at a level approximately that of the central area 2. The margin 4 is formed with a laterally offset portion 5 which affords a resting place for the cover 6. The portion 5 merges into an upstanding portion 7 extending around the portion 5. The portions 5 and 7 afford a recess into which the cover 6 fits nicely. The lower margin of the cover 6 may be turned over as shown at 8 to provide a rim which will slip readily into the recess formed by the portions 5 and 7. Crumbs from the cake are retained in the trough 3 and do not interfere with the engagement between the rim of the cover 6 and the laterally offset portion 5 and the upstanding portion 7. The cover 6 may be provided with a knob 9 fastened to the top of the cover by bolt 10, by which the cover may be handled. The container, so far as described, forms a complete unit which is intended for practical home use and it serves that purpose well.

Often it is desirable to make use of a portable food container and the container herein described is readily adaptable to such use without substantial change and without detracting either from its usefulness or appearance for home use.

The margin 4 of the tray 1 is continued beyond the upstanding portion 7 to form the lip 11 extending laterally therefrom. The edge of the lip 11 may be turned inwardly, as shown in Figure 2, to avoid exposing a raw edge in a position where it might engage other objects. The lip 11 serves to guide the cover 6 as it is being placed on the tray and the lip affords a convenient means by which the tray may be grasped and handled. While the lip 11 is not essential for home use of the container yet it is practically desirable for the foregoing reasons. The lip 11 affords a recess underneath it which serves as the means, forming an integral part of the container, by which the container may be converted into portable use.

To convert the container for home use to a portable container, a clip 12 is provided. The clip 12 is made of wire and is bent to shape, the free ends of the wire being joined by soldering or in any other suitable manner. Thus the clip 12 is made in one piece so that there is nothing about it to come apart, to become lost, to require adjustment, or to require any special attention. The one piece wire clip 12 has laterally inturned portions 13 consisting of arcuate members 14, adapted to engage in the recess afforded on the under side of the lip 11, and projections 15 which extend under the lip 11 and desirably are at an angle such as to insure that contact with the lip 11 shall be only at the ends of the projections 15 and along the arcuate members 14. The laterally inturned portions 13 are arranged at diametrically opposite parts of the margin 4 so that, when pressing against the lip 11, there will be no tendency for the tray to slip from between the laterally inturned portions 13, the laterally inturned portions 13 engaging the lip 11 over a sufficiently long arc to afford adequate resistance to all ordinary tendencies for the container to slip from between the inturned portions.

The laterally inturned portions 13 are joined by an intermediate portion 16 consisting of the uprights 17 connecting with the projections 15 and extending upwardly above the side of the cover 6, the uprights 17 being spaced from the cover so as not to mar the finish thereon or to interfere with the operation of the clip. The uprights 17 are connected by the cross-wires 18 which are formed to overlap centrally thereof, the wires being secured together where they cross, as shown at 19, in any suitable manner as by soldering. The structure afforded by the cross-wires 18 strengthens the clip greatly, affords a convenient handle by which the ensemble may be carried, and provides means for engaging the cover 6. The central portion 20 of the cross-wires 18 is adapted to engage with the knob 9 of the cover when the laterally inturned portions 13 are in engagement with the lip 11. The clip 12 is of such size and shape that it must be sprung when being arranged in place on the container, the uprights 17 and cross-wires 18 remaining in sprung condition so as to apply a spring tension which presses the laterally inturned portions 13 into engagement with the lip 11. The central portion 20 engages with the knob 9 and acts, by spring tension, to press down on the cover so as to hold it tightly in place on the tray. Thus the container is securely held together so that it may be handled freely in carrying it without any danger of dislodging the parts or opening of the container. The strain placed on the central portion 20 by engagement with the knob 9 is in such a direction relative to the laterally inturned portions 13 that the resulting spring tension acts to increase the force pressing the laterally inturned portions into engagement with the lip 11 and, in the same way, when the container is lifted the lifting force applied to the central portion 20, which serves as a handle means, increases the grip of the laterally inturned portions on the lip 11, thus insuring that the clip will, at all times, maintain a secure grip on the container. When removing or placing the clip, it is disengaged, or engaged, with the lip 11 by springing the laterally inturned portions 13 over the lip 11.

The one piece wire clip 12 is easily and inexpensively made; it is light and has adequate strength; it requires little care, there being nothing about it to develop mechanical faults; it is practical in manufacture and use, the wire structure permitting adjustment by bending slightly, to compensate for slight imperfections in manufacture, to adapt the clip to use.

A modification of the invention is illustrated in Figure 4 where a plurality of containers 21, 22 and 23 are shown. The containers may all be alike or they may vary in size, shape and construction, as shown. The container 21 is provided with an outwardly flaring margin 24 which affords a laterally offset portion surrounded by an upstanding portion similar to the corresponding parts of the tray 1 of Figures 1 and 2. The margin 24 terminates in an outwardly extending lip 25 affording a recess on the underside, also like the corresponding construction of the tray 1. Container 22 rests on the laterally extending portion and fits within the upstanding portion of the margin 24. Container 22 has an inwardly pressed annular projection 26 which affords a laterally offset portion surrounded by an upstanding portion to receive the container 23. The margin of the container 22 terminates in an outwardly extending lip 27 which affords a recess on the under side thereof. Container 23 is like container 22 in all respects. Container 22 serves as a cover for container 21 and container 23 as a cover for container 22. A cover 28 is provided for container 23, the cover 28 having an upturned margin 29 which is received in the outwardly flaring margin 30 of the container 23, as shown in Figure 4. The cover 28 is provided with a knob 31 for handling it conveniently. The lips on the various containers afford convenient means for handling them. A one piece wire clip 32, similar in all respects to the clip 12, is provided to fit the nested containers 21, 22 and 23 with the laterally inturned portions 33 engaging with the lip 25 and the handle portion 34 engaging the knob 31 to hold the containers and the cover tightly together and to afford means for carrying the containers. The clip 32 may be removed, leaving a set of nested containers admirably adapted for home use.

Any of the containers 21, 22 or 23 may be used as the base means, the other containers and cover being the covering means, and more or fewer containers may be stacked together, a wire clip of appropriate size being used with the assembly to hold it together and to afford carrying means. Each of the containers 21, 22 and 23 is provided with a lip having a recess on the underside to accommodate the inturned portions of the wire clip so that they may be interchangeably used as the base member to be engaged by inturned portions of a wire clip.

While the invention has been described in detail, by way of illustration, it is not intended so to limit the invention inasmuch as variations may be made in the details of construction, as will be apparent to one skilled in the art, without departing from the spirit and scope of the invention as defined in the following claims.

What we claim as our invention is as follows:

1. In combination, base means adapted to rest on a supporting surface, said base means having an outwardly flaring margin affording a laterally offset portion surrounded by an adjoining upstanding portion, covering means adapted to rest on the laterally offset portion and to fit within the upstanding portion, said base means and covering means enclosing the space therebetween and forming a complete food container, there being a lip extending laterally from the upstanding portion and affording a recess on the under side thereof, a one piece wire clip having inturned portions fitting over and engaging said lip within the recess at diametrically opposite parts of the lip, said clip having an intermediate portion joining the inturned portions, said intermediate portion extending over and engaging the covering means when the inturned portions engage the lip and the clip being in sprung condition to maintain the base means and the covering means tightly together, the clip affording handle means for carrying and being detachable by springing the inturned portions free from the lip.

2. In combination, a tray adapted to rest on a supporting surface and having a central raised area, there being a trough extending around the raised area, said tray having an outwardly flaring margin around the trough, the margin affording a laterally offset portion surrounded by an adjoining upstanding portion, a cover adapted to rest on the laterally offset portion and to fit within the upstanding portion, a knob fastened to the top of the cover, said tray and cover enclosing the space therebetween and forming a complete food container, said tray having a lip extending laterally from the upstanding portion and affording a recess on the under side thereof, a one piece wire clip having inturned portions adapted to engage the lip within the recess at diametrically opposite parts of the lip, said clip having an intermediate portion joining the inturned portions, said intermediate portion extending over the cover and engaging the knob when the inturned portions engage the lip, the clip being in sprung condition to maintain the tray and cover tightly together, the clip affording handle means for carrying and being detachable by springing the inturned portions free from the lip.

3. A food container comprising a base means and covering means adapted to rest on the base means to form a complete food container, a one-piece wire clip having inturned portions and intermediate portions joining the inturned portions, there being a flange on the base means, said inturned portions extending over and engaging the underside of said flange when the intermediate portions extend over and engage the covering means with the clip in sprung condition, the spring force of the clip operating to secure the clip in engagement with the base means and the covering means, handle means on the clip, the clip being detachable and removable by springing the inturned portions free from the flange.

4. A food container comprising a base means and covering means adapted to rest on the base means, the margin of the base means extending beyond the bottom edge of the covering means, a one-piece wire clip having inturned portions and an intermediate portion joining the inturned portions, said wire clip being engageable with the base means and covering means with the inturned portions engaging the underside of the margin of the base means and the intermediate portion extending across and engaging the covering means to hold the covering means and base means together.

FREDERICK F. PFEFFERKORN.
CARL A. STEVENS.